United States Patent [19]

Kaczynski

[11] 4,292,866
[45] Oct. 6, 1981

[54] TOOLHOLDER WITH EXPANSIBLE SHANK

[75] Inventor: Thomas E. Kaczynski, Willoughby, Ohio

[73] Assignee: Kennametal Inc., Latrobe, Pa.

[21] Appl. No.: 111,128

[22] Filed: Jan. 10, 1980

[51] Int. Cl.³ .................. B23B 29/00; B23B 5/22; B26D 1/12
[52] U.S. Cl. .................. 82/36 R; 279/2 R; 407/46; 407/50; 407/109
[58] Field of Search ............ 82/36 A, 36 R, 1 C; 407/46, 47, 50, 101, 102, 109, 91; 408/232, 233, 238, 239; 279/2, 75

[56] References Cited

U.S. PATENT DOCUMENTS

| 1,455,480 | 5/1923 | Dlesk | 408/239 |
| 1,892,904 | 1/1933 | Robinson et al. | 279/2 |
| 1,945,854 | 2/1934 | Hall | 407/50 |
| 2,656,190 | 10/1953 | Towle | 279/2 |
| 3,498,653 | 3/1970 | McCreery | 82/36 R |
| 3,526,025 | 9/1970 | Sletten | 407/109 |
| 3,546,761 | 12/1970 | Gage | 407/50 |
| 4,018,112 | 4/1977 | Heaton et al. | 82/36 A |
| 4,135,418 | 1/1979 | McCray | 82/36 A |

FOREIGN PATENT DOCUMENTS

| 1243161 | 8/1960 | France | 82/36 R |
| 685447 | 9/1979 | U.S.S.R. | 407/50 |

*Primary Examiner*—Harrison L. Hinson
*Attorney, Agent, or Firm*—Lawrence R. Burns

[57] ABSTRACT

A toolholder is disclosed having a tool body with an insert seat thereon and an expansible shank capable of being received in the bore of a tool support member. The expansible shank is capable of being rapidly and securely locked into the bore of the tool support member by reciprocally movable means mounted in the tool body for expanding and contracting said shank.

11 Claims, 6 Drawing Figures

TOOLHOLDER WITH EXPANSIBLE SHANK

BACKGROUND OF THE INVENTION

This invention relates to toolholders and is especially concerned with toolholders with a body having an insert seat on one end and a shank receivable in the bore of the tool support member on the other end. Such tools are used in the cutting and shaping of rotating workpieces where it is important that the toolholder be held in a rigid manner so that no movement occurs during the metal cutting operation.

Many devices in the prior art have proved to to be successful in this regard. In 1970, McCreery was granted U.S. Pat. No. 3,498,653 for his invention on a connector device for a toolholder having an insert seat thereon and a shank receivable in a bore of a toolholder. Since then, other patents having been granted to McCray et al (U.S. Pat. No. 4,135,418) and Bator (U.S. Pat. No. 251,971). The above devices are concerned with the use of ball-like elements to hold the shank of the toolholder in the bore of the tool support member.

Other types of toolholders are firmly anchored to the tool support member, and rather than change the entire toolholder, the insert on the toolholder itself is changed. The number of devices and ways that the cutting insert itself may be held are too numerous to mention in this specification. One of the many ways, however, was described by Friedline et al in U.S. Pat. No. 3,953,143, which comprises an expansible plug member that was loosely receivable in a blind hole and, when expanded, would clamp a cutting insert against a wall of the blind hole. Many other ways of holding a cutting insert in an insert seat of a toolholder have been described by Friedline and others, however.

A need for a faster, more reliable means of interchanging inserts and toolholders is always present, and for this reason, improvements in tool-holders are always being sought.

BRIEF SUMMARY OF THE INVENTION

According to the present invention, a toolholder is provided having an insert seat and having an expansible shank means that is receivable in the bore of a tool support member. The toolholder has an abutment surface for abutting the tool support member and means cooperating to hold the toolholder nonrotational with respect to the tool support member.

The expansible shank on the toolholder is preferably slotted and has reciprocally movable means for expanding and contracting said shank. Preferably, a center hole extends through the center of the tool body and the shank and has a portion tapering inwardly in the region of the slotted shank.

The reciprocally movable means preferably has a convex abutment surface that contacts the tapered portion of the center hole, causing expansion of the shank. Preferably, the reciprocally movable means is a rotatable threaded member mounted on threads in the center hole of the tool body. In the center hole between the end of the threaded member and the tapered portion of the hole is a ball element. When the threaded member is in an advanced position, the ball element contacts the tapered portion and causes expansion of the shank.

The shank of the toolholder has a smooth outer peripheral surface which, when expanded, contacts the inner walls of the bore of the tool support member. The friction forces developed by the abutment force between the peripheral surface and inner wall keeps the toolholder from moving in the bore.

A reduced cross sectional area may comprise part of the shank with a shoulder formed at the juncture of the reduced cross section and the peripheral surface. The shoulder faces the insert seat on the tool body and may mate with an internal groove formed in the bore of the tool support member.

The peripheral surface of the shank is preferably circular or cylindrical when viewed in end view and the reduced cross section may be polygonal when viewed in end view.

The expansible shank is preferably slotted with the slots connecting the shank surface with the center hole. The slots extend longitudinally and preferably through the end of the shank. Stress relief holes are drilled radially inward at the other end of the slots from the end of the shank.

It is an object of the present invention to provide a more efficient, quick release mechanism for a toolholder.

It is a further object of the present invention to provide a quicker acting, more reliable means of changing toolholders.

It is a further object of the present invention to provide a less expensive yet quick and reliable interchangeable toolholder.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
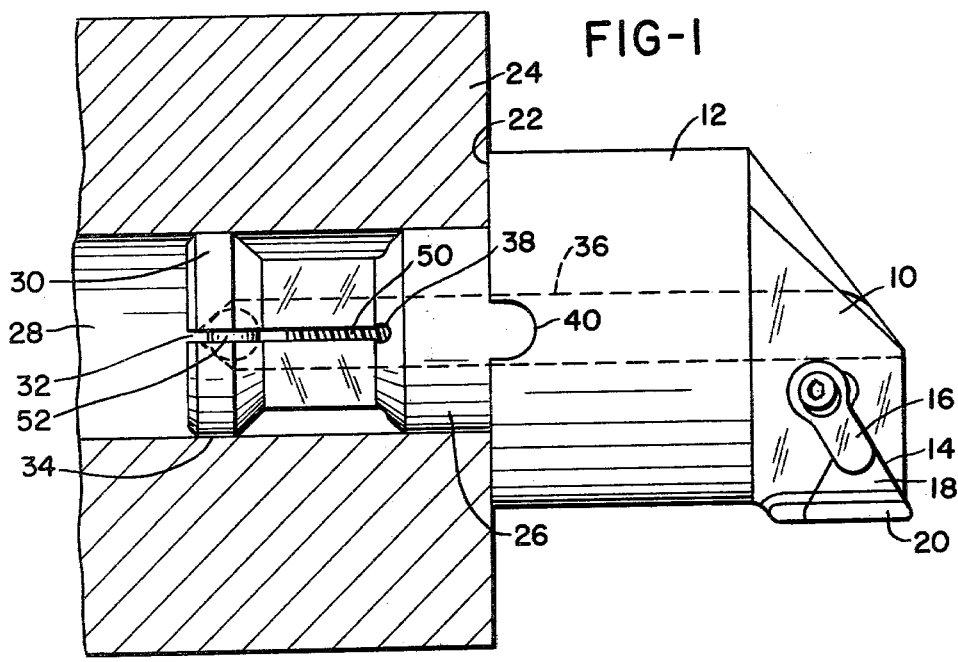
FIG. 1 is a sectionalized plan view of a tool-holder and tool support member according to the present invention.

Referring to the drawings somewhat more in detail, what is shown in FIG. 1 is a toolholder 10 which comprises a tool body 12 having a cutting insert seat 14 located thereon. The cutting insert seat 14 has a clamp 16 to hold a chipbreaker 18 in a cutting insert 20 in the insert seat 14. Tool body 12 has an abutment shoulder 22 which, when in place, abuts with the tool support member 24 upon which the toolholder 10 is mounted.

The tool body 12 has extending rearwardly from the insert seat 14 a shank means 26 which is receivable within a bore 28 of the tool support member 24. The shank means 26 has an expansible portion 30 and a slotted portion 32. Slotted portion 32 communicates from the outer peripheral surface 34 of the shank means to a central hole 36 that extends through the tool body 12 and the shank means 26 of the toolholder 10.

Peripheral surface 34 of the shank means 26 is preferably cylindrical or circular when viewed in end view. Slotted portions 32 preferably extend through the rearmost portion of the shank means 26 toward the insert seat 14 and terminate in enlarged, radially directed, drill holes 38 which act as stress relieving holes for the slot portions 32.

A notch 40 is preferably formed on the tool body 12 so that it may mate with a corresponding projection on the tool support member 24 so as to hold the tool body 12 nonrotatable with respect to the tool support member 24.

Figure 2:
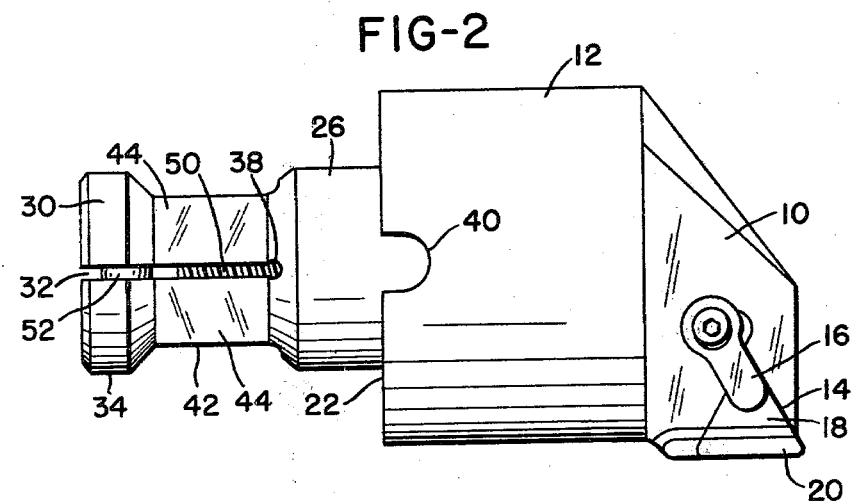
FIG. 2 is a plan view of a toolholder according to the present invention.

Shown in FIG. 2 is the tool holder 10 having a tool body 12 having a cutting insert seat 14 located thereon. The tool body 12 is shown having a rearwardly facing abutment surface 22 and rearwardly extending shank means 26. Shank means 26 has a peripheral portion 34 that is expansible so as to mate with the internal surface of a bore 28 as described in FIG. 1.

Figure 3:
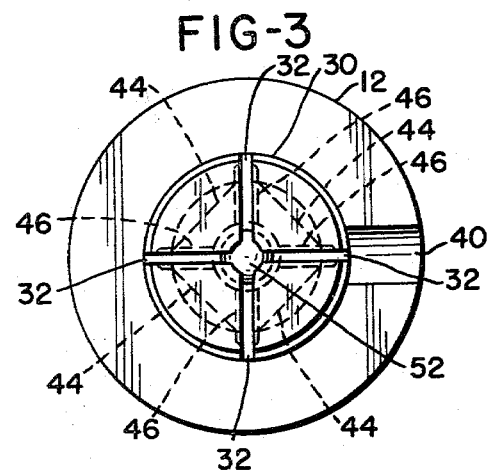
FIG. 3 is an end view of the expansible shank according to the present invention.

Shank means 26 in FIG. 2 comprises both the peripheral portion 34 of the shank means and, also, a reduced cross sectional area 42 that may be circular or polygonal when viewed in an end view as is shown in FIG. 3. Part of the purpose of the reduced cross sectional area 42 is to alleviate the forces that may be necessary to expand the peripheral portions 34 of the shank means 26.

What is shown in FIG. 3 is an end view of the toolholder 10 with the shank means 26 having the slotted portions 32 shown therein. The dotted lines 44 indicate the polygonal shape of the reduced diameter section 42 with the dotted lines 46 indicating the drilled stress relieving holes 38 in the shank means 26.

Shown in FIG. 4 is, again, the tool body 12 having the rearwardly extending shank means 26. Extending through the tool body 12 and the shank means 26 is a centrally located hole 36 which, in the region of the peripheral surface 34 of shank means 26, has a tapering portion 48 that tapers inwardly as it extends rearwardly in the shank means 26. Mounted and located in the central opening 36 is a reciprocally movable member 50 that is, preferably, a threaded member, but is mounted on corresponding threads formed on the central opening 36 in tool body 12 of toolholder 10.

Figure 4:
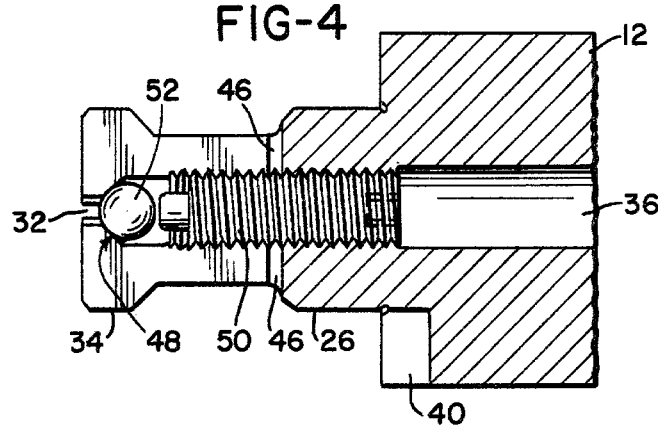
FIG. 4 is an incomplete sectionalized view of the central hole of the toolholder according to the present invention.

Acting against the tapered portion 48 of the central opening 36 is a convexly shaped body 52 which, as is shown in FIG. 4, is a spherical ball-like element upon which the threaded member 50 acts in order to expand the peripheral surfaces 34 of the shank means 26.

Figure 5:
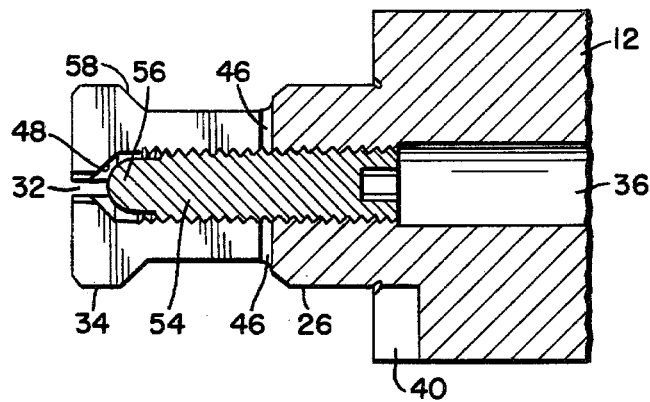
FIG. 5 is an alternate incomplete construction of the central hole according to the present invention.

An alternate construction of the invention is shown in FIG. 5 wherein the tool body 12 is shown having the shank means 26 with the expansible peripheral portion 34. Central opening 36 is shown extending through the tool body 12 and the shank means 26. Located therein is an alternate threaded member 54 which has a convexly shaped end 56 which acts by itself against the tapered portion 48 of the central opening 36.

Figure 6:
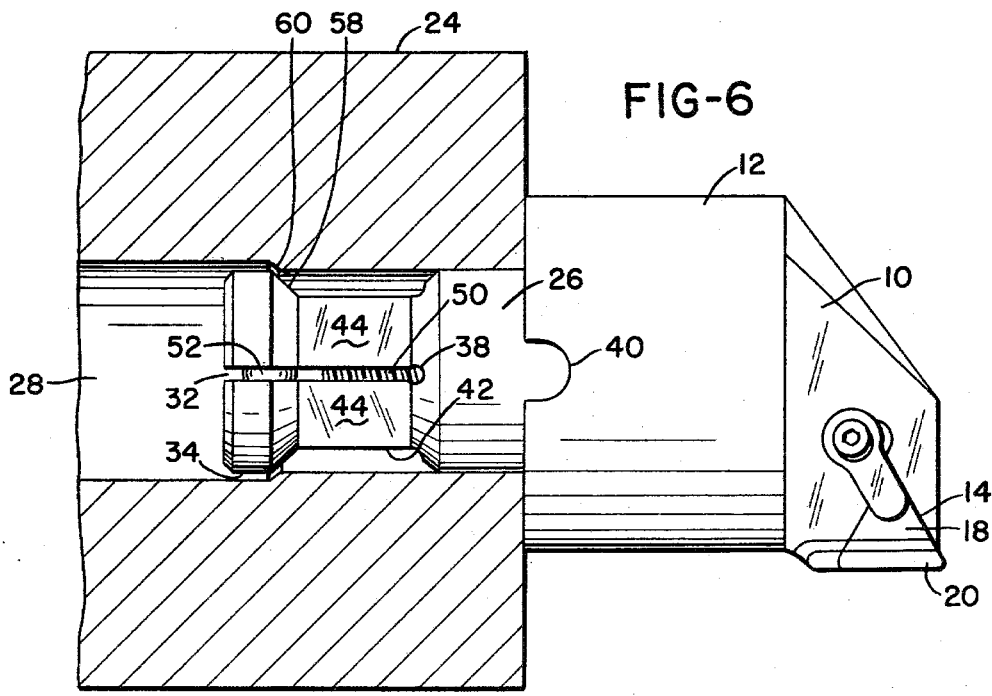
FIG. 6 is a partially sectionalized plan view of an alternate construction according to the present invention.

What is shown in FIG. 6 is an alternate construction of the present invention having a tool-holder 10 with tool body 12 having shank means 26 extending into a bore 28 of a tool support member 24. Shank means 26 of the toolholder 10 has an expansible peripheral surface 34 and, also, has a reduced cross sectional area 42 thereon.

Formed at the juncture of the expansible peripheral surface 34 and the reduced cross sectional area 42 is a shoulder area 58 which faces toward the insert seat 14 of the toolholder 10. Formed in the bore 28 of the tool support member 24 is another shoulder area 60 that faces away from the insert seat 14 when the toolholder is inserted in the tool support member 24. Preferably, the two shoulder areas are dimensioned so that when the toolholder 10 is inserted into the tool support member 24 and the expansible shank means is expanded, the shoulder areas 58 and 60 will mate so as to pull the toolholder 10 even further into abutment with the tool support member 24. In order to accomplish the above affect, the shoulders 58 and 60 are shown angled at 45 degrees from the horizontal.

It should be understood that drill holes 38 are located at the root of each slot portion 32.

Modifications may be made within the scope of the appended claims.

What is claimed is:

1. A toolholder comprising: a tool body having an insert seat thereon and having an abutment surface thereon for abutting a tool support member and with means thereon to keep said tool body nonrotational with respect to the tool support member; expansible shank connected to said tool body and said expansible shank receivable in a bore of a tool support member; reciprocally movable means comprising a convex abutment surface for expanding said expansible shank so as to lock said shank in the bore of the tool support member.

2. A toolholder according to claim 1 in which said expansible shank comprises a slotted shank and a centrally located hole in said expansible shank extending through said tool body and expansible shank, said center hole tapering inwardly in said expansible shank and said reciprocally movable means contacting said tapered portion of said center hole to expand said shank and lock said shank in the bore of the tool support member.

3. A toolholder according to claim 1 in which said convex abutment surface comprises the lead portion of a threaded member.

4. A toolholder according to claim 1 in which said convex abutment surface comprises a ball.

5. A toolholder according to claims 3 or 4 wherein said reciprocally movable means further comprises a threaded member extending through, and in threaded engagement with, said expansible shank.

6. A toolholder according to claim 5 wherein said expansible shank comprises an outer peripheral surface that mates with the surface of the bore in the tool support member so that the frictional forces between the outer peripheral surface and the surface of the bore hold the toolholder in place on the tool support member.

7. A toolholder according to claim 6 wherein said expansible shank comprises a section of reduced cross section from said outer peripheral surface, and a shoulder area facing said insert seat and formed at the juncture of the reduced cross section and the peripheral surface.

8. A toolholder according to claim 7 wherein the outside peripheral surface of said expansible shank is circular in cross section.

9. A toolholder according to claim 7 wherein said reduced section of said slotted expansible shank is polygonal in cross section.

10. A toolholder according to claim 7 wherein said shoulder facing the insert seat abuts against a ridge on the bore of the tool support member when said slotted expansible shank is in the expanded mode.

11. The method of retaining a toolholder in a tool support member which comprises the steps of:

providing slots in the shank of a toolholder so that the outer peripheral surface of the toolholder shank is expansible; providing convex abutment means for expanding the toolholder shank; inserting the toolholder shank in a bore in a tool support member until said toolholder abuts said tool support member; expanding the outer peripheral surface of the toolholder shank so that it contacts the inner wall of the bore of the tool support member providing enough friction force between the toolholder shank peripheral surface and the inner wall of the bore so as to hold the toolholder rigidly in the tool support member during machining operations.

* * * * *